(12) United States Patent
Spittle et al.

(10) Patent No.: US 10,907,098 B2
(45) Date of Patent: *Feb. 2, 2021

(54) BARK AND WOOD FIBER GROWING MEDIUM

(71) Applicant: PROFILE PRODUCTS L.L.C., Buffalo Grove, IL (US)

(72) Inventors: Kevin Scott Spittle, Vero Beach, FL (US); Gary Lane Bowers, Jonesborough, TN (US)

(73) Assignee: PROFILE PRODUCTS L.L.C., Buffalo Grove, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/589,694

(22) Filed: Oct. 1, 2019

(65) Prior Publication Data

US 2020/0032141 A1 Jan. 30, 2020

Related U.S. Application Data

(63) Continuation of application No. 16/366,319, filed on Mar. 27, 2019, now Pat. No. 10,519,073, which is a
(Continued)

(51) Int. Cl.
*C09K 17/52* (2006.01)
*C05F 11/00* (2006.01)
(Continued)

(52) U.S. Cl.
CPC .............. *C09K 17/52* (2013.01); *A01G 24/00* (2018.02); *C05D 9/02* (2013.01); *C05F 11/00* (2013.01); *C05G 3/80* (2020.02)

(58) Field of Classification Search
CPC ..................................................... C09K 17/16
See application file for complete search history.

(56) References Cited

U.S. PATENT DOCUMENTS

| 441,760 A | 12/1890 | Horrocks |
| 524,650 A | 8/1894 | Potter |

(Continued)

FOREIGN PATENT DOCUMENTS

| CN | 2223300 Y | 3/1996 |
| CN | 1191524 A | 8/1998 |

(Continued)

OTHER PUBLICATIONS

Non-Final Office Action for U.S. Appl. No. 15/322,899, dated Apr. 10, 2020 that issued in connection with a related application is enclosed.

(Continued)

*Primary Examiner* — Wayne A Langel
(74) *Attorney, Agent, or Firm* — Brooks Kushman P.C.

(57) ABSTRACT

A method for making a growing medium includes a step of combining tree bark and/or wood components together to form an initial composition; heating the initial composition to a temperature greater than about 149° C. under steam in a pressurized vessel; processing the initial composition through a refiner with a plurality of opposing disks to obtain the fibrous growing medium, the refiner separating fibers from each other; wherein the growing medium has total porosity of 88 volume % or more.

21 Claims, 1 Drawing Sheet

Related U.S. Application Data continuation of application No. 15/400,363, filed on Jan. 6, 2017, now Pat. No. 10,266,457, which is a continuation-in-part of application No. 15/322,906, filed as application No. PCT/US2015/038312 on Jun. 29, 2015, now Pat. No. 10,519,373.

(60) Provisional application No. 62/018,640, filed on Jun. 29, 2014.

(51) Int. Cl.
*C05G 3/80* (2020.01)
*A01G 24/00* (2018.01)
*C05D 9/02* (2006.01)

(56) References Cited

U.S. PATENT DOCUMENTS

| | | |
|---|---|---|
| 524,695 A | 8/1894 | Potter |
| 1,015,764 A | 1/1912 | Potter |
| 1,222,523 A | 4/1917 | Cary |
| 1,331,001 A | 2/1920 | Conrad |
| 1,610,096 A | 12/1926 | Jolly |
| 1,610,791 A | 12/1926 | Jolly |
| 1,629,068 A | 5/1927 | Cook |
| 2,100,300 A | 11/1937 | Mitchell |
| 2,157,684 A | 5/1939 | Williams |
| 2,744,045 A | 5/1956 | Collins |
| 2,757,150 A | 7/1956 | Heritage |
| 2,759,224 A | 8/1956 | Simons |
| 2,795,080 A | 6/1957 | Williams |
| 2,902,722 A | 9/1959 | Wallace |
| 2,986,778 A | 6/1961 | Goodwin et al. |
| 2,989,252 A | 6/1961 | Babb |
| 2,995,434 A | 8/1961 | Burton |
| 3,051,398 A | 8/1962 | Babb |
| 3,139,650 A | 7/1964 | Diesel |
| 3,150,215 A | 9/1964 | Houghton |
| 3,192,571 A | 7/1965 | Halleux |
| 3,208,107 A | 9/1965 | Kotter |
| 3,251,096 A | 5/1966 | Rapp |
| 3,862,472 A | 1/1975 | Norton et al. |
| 4,031,003 A | 6/1977 | Husky |
| 4,057,876 A | 11/1977 | Sawyer |
| 4,097,209 A | 6/1978 | Garrick et al. |
| 4,109,875 A | 8/1978 | Condarco et al. |
| 4,192,042 A | 3/1980 | Jagst |
| 4,202,079 A | 5/1980 | Prather |
| 4,237,814 A | 12/1980 | Ormos et al. |
| 4,274,177 A | 6/1981 | Grimshaw et al. |
| 4,300,267 A | 11/1981 | Winch et al. |
| 4,435,353 A | 3/1984 | Forry et al. |
| 4,458,381 A | 7/1984 | Van Doorn et al. |
| 4,479,285 A | 10/1984 | Ragan |
| 4,548,131 A | 10/1985 | Williams |
| 4,625,368 A | 12/1986 | Leifeld |
| 4,662,031 A | 5/1987 | Feiks et al. |
| 4,723,343 A | 2/1988 | Bernhardt et al. |
| 4,756,059 A | 7/1988 | Temburg |
| 4,766,648 A | 8/1988 | Kerley |
| 4,788,790 A | 12/1988 | Zeager |
| 4,796,335 A | 1/1989 | Kranefeld et al. |
| 4,932,156 A | 6/1990 | Underwood |
| 4,971,540 A | 11/1990 | Barnes |
| 4,987,646 A | 1/1991 | Leifeld et al. |
| 4,993,119 A | 2/1991 | Roberson |
| 5,087,400 A | 2/1992 | Theuveny |
| 5,121,841 A | 6/1992 | Harrington et al. |
| 5,192,587 A | 3/1993 | Rondy |
| 5,343,597 A | 9/1994 | Pinto et al. |
| 5,513,805 A | 5/1996 | Fisher et al. |
| 5,537,809 A | 7/1996 | Blalock |
| 5,617,614 A | 4/1997 | Locatelli et al. |
| 5,845,367 A | 12/1998 | Vezzoli et al. |
| 6,195,841 B1 | 3/2001 | Mascheretti et al. |
| 6,327,745 B1 | 12/2001 | Franke |
| 6,349,499 B1 | 2/2002 | Spittle |
| 6,393,665 B1 | 5/2002 | Foster et al. |
| 6,435,433 B1 | 8/2002 | Hesch |
| 6,442,803 B1 | 9/2002 | Foster et al. |
| 6,460,223 B1 | 10/2002 | Pinto |
| 6,539,585 B1 | 4/2003 | Anthony |
| 6,615,454 B1 | 9/2003 | Anthony |
| 6,711,850 B2 | 3/2004 | Yelanich et al. |
| 6,740,342 B1 | 5/2004 | Hulst et al. |
| 6,773,545 B2 | 8/2004 | Tanner et al. |
| 6,786,438 B2 | 9/2004 | Winn |
| 6,800,319 B1 | 10/2004 | Hulst et al. |
| 7,032,273 B2 | 4/2006 | Pinto |
| 7,752,715 B2 | 7/2010 | Morgner et al. |
| 7,797,798 B2 | 9/2010 | Rosemann |
| 8,567,117 B2 | 10/2013 | Spittle |
| 8,894,811 B1 | 11/2014 | Brown |
| 8,984,805 B2 | 3/2015 | Shpak et al. |
| 10,266,457 B2 * | 4/2019 | Spittle .................... C09K 17/16 |
| 10,519,073 B2 | 12/2019 | Spittle et al. |
| 10,519,373 B2 * | 12/2019 | Spittle .................... C05F 11/00 |
| 2002/0026688 A1 | 3/2002 | Rubenach |
| 2002/0189053 A1 | 12/2002 | Pasini et al. |
| 2003/0056873 A1 | 3/2003 | Nakos et al. |
| 2005/0076564 A1 | 4/2005 | Castleberry |
| 2006/0207064 A1 | 9/2006 | Minter |
| 2007/0186463 A1 | 8/2007 | Lougheed |
| 2008/0280760 A1 | 11/2008 | Oliver |
| 2009/0101294 A1 | 4/2009 | Young |
| 2010/0155513 A1 | 6/2010 | Brick et al. |
| 2012/0255143 A1 | 10/2012 | Iten et al. |
| 2013/0075504 A1 | 3/2013 | Beaudet et al. |
| 2013/0075509 A1 | 3/2013 | Beaudet et al. |
| 2013/0255048 A1 | 10/2013 | Crary et al. |
| 2015/0225304 A1 | 8/2015 | Donze et al. |
| 2015/0368165 A1 | 12/2015 | Tournayre et al. |
| 2016/0083651 A1 | 3/2016 | Phillips et al. |
| 2016/0138201 A1 | 5/2016 | Bocht |
| 2017/0305802 A1 | 10/2017 | Tournayre et al. |
| 2018/0057966 A1 | 3/2018 | Spittle et al. |
| 2020/0299208 A1 | 9/2020 | Norden et al. |

FOREIGN PATENT DOCUMENTS

| | | |
|---|---|---|
| CN | 1607999 A | 4/2005 |
| CN | 1612686 A | 5/2005 |
| CN | 101096786 A | 1/2008 |
| CN | 101219916 A | 7/2008 |
| CN | 201495328 U | 6/2010 |
| CN | 201947750 U | 8/2011 |
| CN | 202543422 U | 11/2012 |
| CN | 202730348 U | 2/2013 |
| DE | 2432432 | 1/1975 |
| DE | 3235452 A1 | 3/1984 |
| DE | 4243126 A1 | 6/1994 |
| DE | 10360635 A1 | 7/2005 |
| EP | 0147349 A1 | 7/1985 |
| EP | 1491666 A1 | 12/2004 |
| EP | 1914344 A1 | 4/2008 |
| FR | 2705191 A1 | 11/1994 |
| GB | 437242 | 10/1935 |
| GB | 1337694 | 11/1973 |
| WO | 9853669 A1 | 12/1998 |
| WO | 2006055715 A2 | 5/2006 |

OTHER PUBLICATIONS

W.C. Fonteno et al., "Procedures for Determining Physical Properties of Horticultural Substrates Using the NCSU Promoter," North Carolina State University, NCSU Porometer Manual, 27 pages.
Related U.S. Appl. No. 15/322,921, filed Dec. 29, 2016. 44 pages (WO2016/003905) "Growing Medium and Mulch Fiber Opening Apparatus."
Related U.S. Appl. No. 15/322,899, filed Dec. 29, 2016. 24 pages (WO2016/003903) "Naturally Dyed Mulch and Growing Media".
IPR & International Search Report, PCT/US2015/038315, dated Jun. 29, 2015, 16 pages.

(56) References Cited

OTHER PUBLICATIONS

IPR & International Search Report, PCT/US2015/038312, dated Jun. 29, 2015, 10 pages.
IPR & International Search Report, PCT/US2015/038318, dated Jun. 29, 2015, 11 pages.
IPR & International Search Report, PCT/US18/12649, dated May 7, 2018 (13 pages).
EP Search Report, Application No. EP 15 81 5634.9 (PCTUS2015/038318, dated May 14, 2018) 4 pages.
Maatjie, MA, "Growth, Yield and Quality of Hydroponically Grown Tomatoes as Affected by Different Particle Sizes of Sawdust," 2015. University of South Africa dissertation, Figure 4-6; pp. 13, 30.
Final Office Action, related U.S. Appl. No. 15/322,921; dated Feb. 5, 2019.
Notice of Allowance, related U.S. Appl. No. 15/400,363; dated Jan. 17, 2019.
Chinese 1st Office Action, Serial No. 201580036062.0, dated Jan. 18, 2019.
Office Action, related U.S. Appl. No. 15/400,363; dated Sep. 13, 2018.
Chinese Office Action dated Nov. 2, 2018, Application No. 201580035717.2.
European Office Action dated Jun. 13, 2018, Application No. 15815634.9.
Australian Office Action dated May 9, 2018, Application No. 2015284367.
Office Action, related U.S. Appl. No. 15/322,921; dated Jun. 15, 2018.
Chinese Office Action, Application No. 2015800357172., dated Apr. 22, 2019, 9 pages (No translation available).
Office Action, related U.S. Appl. No. 16/366,319, dated May 2, 2019.
Australian Examination Report No. 2, Application No. 2015284367, dated Feb. 26, 2019, 4 pages.
Australian Office Action dated Feb. 22, 2019, Application No. 2015284371.
Office Action, related U.S. Appl. No. 15/322,906; dated Jul. 2, 2018.
Final Office Action, related U.S. Appl. No. 15/322,906, dated Jan. 30, 2019.
Search Report & Written Opinion of related application No. PCT/US18/57234, dated Jan. 7, 2019.
Chinese 2nd Office Action, Application No. 201580036062.0, dated Sep. 25, 2019.
U.S. Office Action dated Sep. 10, 2019 for related U.S. Appl. No. 15/322,921.
U.S. Office Action dated Sep. 17, 2019 for related U.S. Appl. No. 15/322,899.
Notice of Allowance dated Sep. 27, 2019 for related U.S. Appl. No. 16/366,319.
Office Action dated Jul. 18, 2019 issued in connection with related U.S. Appl. No. 15/792,100.
CN Office Action dated Feb. 3, 2020, which issued in connection with related CN application Serial No. 2015800357172.
Final Office Action for U.S. Appl. No. 15/322,921, dated Mar. 30, 2020 that issued in connection with a related application is enclosed.
Office Action dated Feb. 18, 2020, which issued in connection with related U.S. Appl. No. 15/792,100.
3rd Chinese Office Action for CN 201580036062.0, dated Jun. 28, 2020 and English Translation.
Notice of Allowance dated Aug. 6, 2020 received in corresponding application U.S. Appl. No. 15/322,899.
European Office Action Report, dated Sep. 11, 2020, for EP Application No. 15 815 443.5, 7 pages.
Canadian Office Action Report, dated Sep. 21, 2020, for related CA Application No. 2,953,792, 4 pages.
4th Chinese Office Action, dated Oct. 13, 2020 for Chinese Application No: CN201580035717.2. English Translation Provided.
Foreign Textile Technology, vol. 3, Mar. 31, 1975, Shanghai Institute of Textile Technology, Shaghai Institute of Science and Technology Information, "Improvement of card clothing on carding machine," http://img.duxiu.com/n/print.jsp, retrieved Sep. 21, 2020, 3 pages. English Translation Provided (5 pages).
Basic Theory of Carding, Apr. 30, 2012, Zhang Wengeng et al., Donghua University Press, "6.3 Card Clothing," http://img.duxiu.com/n/print.jsp, retrieved Sep. 21, 2020, ISBN978-7-5669-0034-0/TS 316, 2 pages. English Translation Provided (1 page).

* cited by examiner

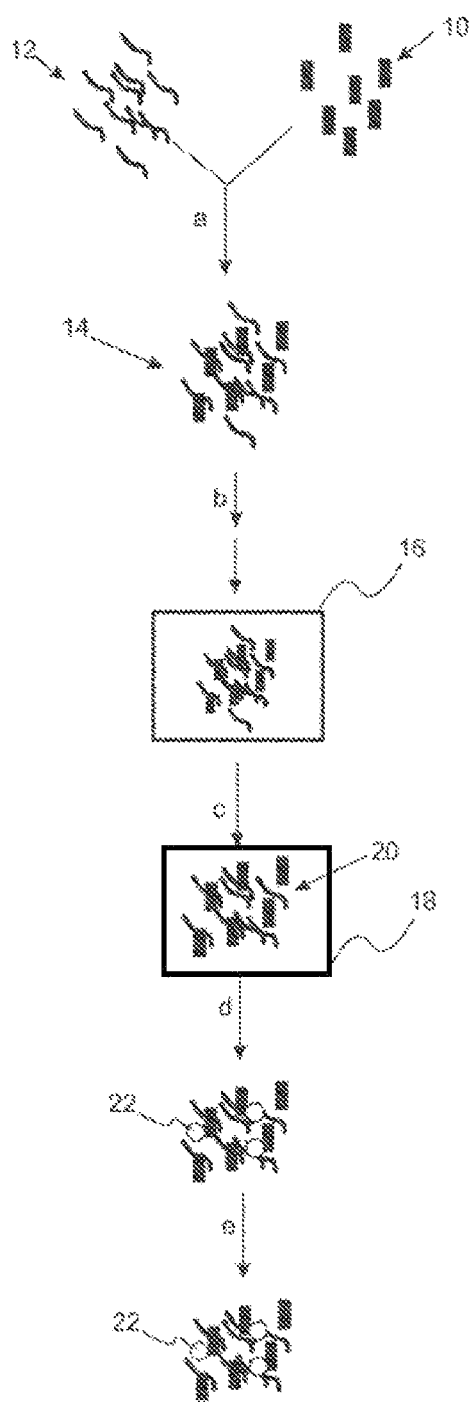

BARK AND WOOD FIBER GROWING MEDIUM

CROSS-REFERENCE TO RELATED APPLICATIONS

This application is a continuation of U.S. patent application Ser. No. 15/322,906, filed Dec. 29, 2016 (pending) which is a National Stage Application of PCT/US2015/038312, filed Jun. 29, 2015 (expired), which claims priority to U.S. provisional application Ser. No. 62/018,640, filed Jun. 29, 2014, the disclosures which are incorporated in their entirety by reference herein.

TECHNICAL FIELD

The present invention is related to a substrate that can be used as a replacement for peat in a growing medium.

BACKGROUND

Peat is a widely used organic material for agricultural and horticultural applications. Peat is used to improve soil structure, retain moisture, and increase acidity. Peat is also frequently added into agricultural mixes to increase water-holding capacity and/or to decrease weight. Since peat is typically harvested from natural sources such as mires and peat lands, mining of peat presents a threat to fragile peat bog ecosystems by disrupting wildlife habitats and endangering endemic species. Peat lands also contribute to healthy watersheds and aid in providing safe drinking water for human populations. Besides their water filtration capabilities, peat bogs are effective in flood prevention and serve as a very efficient carbon sink. Thus, there is a desire to preserve peat lands and to decrease commercial use of peat.

Various substitutes for peat have been suggested, for example, coir or coconut fiber derived from the husk of the coconut fruit, wood-based substrates, or rice hulls. Yet, all of these substitutes suffer from a variety of drawbacks. For example, neither substitute provides a satisfactory volume of air space. The substitutes also have a relatively high dry and wet bulk density, thus contributing to a relatively high weight of products which include the substitute. Additionally, some of the substitutes may be, just like peat, available only on a limited basis, and their harvesting may have environmental implications.

Accordingly, there is a need for peat replacements that do not negatively impact the environment and which provide desirable properties to a growing medium.

SUMMARY OF THE INVENTION

The present invention solves one or more problems of the prior art by providing a mulch composition or growing medium including a combination of tree bark and/or one or more wood components. The mulch composition or growing medium is made by a method wherein tree bark and/or one or more wood components are combined together to form an initial composition which is heated to a temperature greater than about 300° F. (about 149° C.) under steam in a pressurized vessel and fiberized in a refiner to form the fibrous growing medium. The resultant fibrous mulch composition or growing medium has total porosity of 88 volume % or more. The mulch composition or growing medium has a dry bulk density of about 80 kg/m$^3$ or lower and wet bulk density of about 120 kg/m$^3$ or lower. The mulch composition or growing medium is ideal as a standalone mulch composition or growing medium as well as an additive to peat-based growing media, and to amend other existing growing media. The mulch composition or growing medium can also be used to displace at least a portion of peat, composted pine bark, perlite, vermiculite, sand, rock wool, compost, animal manure, rice hulls, hardwood bark, softwood bark, coir, the like, or a combination thereof in various growing mixes.

BRIEF DESCRIPTION OF THE DRAWINGS

FIG. 1 provides a schematic flowchart illustrating the formation of the growing medium.

DETAILED DESCRIPTION

As required, detailed embodiments of the present invention are disclosed herein; however, it is to be understood that the disclosed embodiments are merely exemplary of the invention that may be embodied in various and alternative forms. The FIGURE is not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "dominant wavelength" refers to a way of describing polychromatic light mixtures in terms of monochromatic light that evokes an identical perception of hue. It is determined on the International Commission on Illumination (CIE)'s color coordinate space by a straight line between the color coordinates for the color of interest and the coordinates for the illuminate. The intersection at the perimeter of the coordinate space nearest the color of interest is the dominant wavelength.

The term "growing medium" refers to a soil-free substrate or a substrate with soil, or a combination of materials used to provide physical support, water retention, aeration, and/or nutrient supply for plant growth so that a plant can establish its root system within the growing medium and allow for root growth, as the roots grow in spaces between individual particles of the growing medium.

The term "mulch" as used herein means a layer of fibrous material that is applied to a soil to reduce erosion, to improve water retention, and/or to hold a seed in place on the soil surface long enough for the seed to germinate and for the root to develop within the soil below the mulch. Hydraulic mulches are mulches applied by spraying with water through a hydraulic seeder or similar device.

The mulch composition or growing medium may include one or more wood components. The term "wood components" refers to wood chips, wood fiber, or their combination. The wood components may be derived from coniferous and deciduous trees and may be prepared by any convenient manner, for example as disclosed for wood fibers in U.S. Pat. No. 2,757,150. Any type of wood components may be used, but wood components of the softwood varieties such as yellow poplar, cedar such as Western red cedar, fir such as Douglas fir, California redwood, and particularly, pine such as Ponderosa, Sugar, White, and Yellow varieties of pine are preferred.

A mulch composition or growing medium, and in particular, a fibrous mulch composition or growing medium, may include about 5 to about 95 weight % of tree bark mixed with about 95 to about 5 weight % of wood components, based on the total weight of the mulch composition or growing medium. The mulch composition or growing medium may include about 10 weight % of tree bark and about 90 weight % of wood components, based on the total weight of the mulch composition or growing medium. The mulch composition or growing medium may include about 20 to about 70 weight % of tree bark and about 30 to about 80 weight % of wood components, based on the total weight of the mulch composition or growing medium. Alternatively, the mulch composition or growing medium may include about 50 to about 60 weight % of tree bark and about 40 to about 50 weight % of wood components, based on the total weight of the mulch composition or growing medium. The mulch composition or growing medium may include about 90 weight % of tree bark and about 10 weight % of wood components, based on the total weight of the mulch composition or growing medium. The mulch composition or growing medium may further include about 0 to about 10 weight % or more of additional components, based on the total weight of the mulch composition or growing medium, as set forth below.

The tree bark may contain one or more pigments or pigment precursors that give color to its layers. Some bark (for example eucalyptus bark and sycamore bark) may be light-colored initially, but darken after its pigments are oxidized. Pigments included in the bark may include, but are not limited, to tannins such as tannic acid (e.g., quercitannic acid and gallotanic acid). Non-limiting examples of useful tree barks containing one or more pigments are named above. In addition, during heat treatment, additional pigments may develop in the bark, in the wood, or both, which contribute to the color of the mulch product or the growing medium. This is what is meant by "pigment precursors."

The amount, age, moisture, and/or other properties of the bark used may influence hue and/or intensity of the imparted color. For example, low quantities of bark may result in light brown color of the mulch composition or growing medium while high quantities of bark may result in dark brown color. At least about 1 weight %, about 3 weight %, preferably about 5 weight % of bark may be needed to obtain mulch or growing medium dyed by the bark pigments. To color-change the mulch or growing medium, about 1 to about 99 weight % of bark may be included in the initial composition, based on the total weight of the initial composition. Additional bark may be added during the process of producing mulch or growing medium so that the final color of the fiber product may be adjusted to the desired hue. Concerning the age of bark, the bark from the most recently debarked trees generally provides for the most intense color change of the wood components. Moisture of the bark may be about 30 to 60%, measured by ASTM D4442-07, to provide adequate color change of the wood components.

The mulch composition or growing medium may have a color with a dominant wavelength from about 510 nm to about 780 nm, about 590 nm to about 770 nm, about 620 nm to about 760 nm, or about 675 nm to about 750 nm relative to a white illuminate. The mulch composition or growing medium may have a red to brown to black color. The mulch composition or growing medium may have a yellow, orange, gray, or green color. The mulch composition or growing medium may have hsl color coordinates such that the "h value" (hue) is from about 25 to about 45, the "s value" (saturation) is from about 20 to about 100, and the "l value" (lightness) is less than about 50. The l value may be from about 0 to about 25.

The mulch composition or growing medium may further include a non-permanent dye that is eventually removed or that eventually fades after the composition is applied. Preferably, the non-permanent dye is non-toxic so that no toxic chemicals are leached from the mulch composition or growing medium into the environment. The non-permanent dye may comprise natural and/or synthetic compounds. The non-permanent dye may comprise compounds derived from plants, fungi, lichens, invertebrates, insects, minerals, the like, or a combination thereof. Any part of the plant may be utilized to provide the dye such as roots, petals, leaves, stems, shoots, stalks, hulls, husks, ripe and/or unripe fruit, or seed. Exemplary sources of plant dyestuffs include tree varieties named above; vegetables such as carrots, beetroot, red cabbage, artichoke, spinach, celery; fruit such as blueberries, pomegranate, strawberries, avocado, cherries, raspberries, mulberries, elderberries, blackberries, grapes, peach; turmeric, fennel, basil, paprika, saffron, tea plants, coffee plants, barberry, bloodroot, lilac, coneflower, dandelion, goldenrod, hollyhock, ivy, St John's Wort, yellow dock, rose, lavender, cornflower, hyacinth, Queen Anne's Lace, hibiscus, daylily, safflower, camellia, snapdragon, nettle, milkweed, peony, Black-eyed Susan, hydrangea, chamomile, alfalfa, crocus, marigold, or the like. Exemplary mineral-based dyestuffs include iron oxide and carbon black. Exemplary useful non-permanent dye includes ELCOMENT BLACK 7822 commercially available from Greenville Colorants. Another exemplary type of non-permanent dye may include green pigments.

The non-permanent dye may be combined with the bark alone and/or with the components alone before the initial composition is formed before step a), with the initial composition in step a), with the mulch composition or growing medium in step b), in step c), in step d), in step e), after step e), or in more than one step. At least about 0.1 to about 2 weight % of nonpermanent dye may be added to the initial composition to cause color change of the wood fiber, based on the total weight of the initial composition. About 0.1 to 15 weight % or more, about 2 to 10 weight %, about 3 to 7 weight % of the non-permanent dye may be added to the initial composition, based on the total weight of the initial composition. At least about 2-40 pounds of non-permanent dye may be added per ton of the final mulch or growing medium to achieve color change.

Typically, the removable non-permanent dye imparts a darker color on the mulch composition or growing medium than when the non-permanent dye is absent therein. The non-permanent dye may be washed away after several days (about 1 to about 30 days or after more extensive time period) after being applied in the field. The non-permanent dye may fade away or begin to fade away (e.g., from exposure to sunlight or other environmental conditions) after several days such as about 1 to about 30 days or after more extensive time period after being applied in the field.

The mulch composition or growing medium with the non-permanent dye may have a color with a dominant wavelength from about 400 nm to about 780 nm, about 510 nm to about 770 nm, about 590 nm to about 760 nm, or about 620 nm to about 750 nm relative to a white illuminate. The color of the mulch composition or growing medium including the non-permanent dye may vary. The fiber-containing product with the non-permanent dye may have a red to brown to black color. But other colors such as green, blue, yellow, orange, purple, or gray hues are contemplated as well. The type and amount of dye determine intensity of the color. Typically, the removable nonpermanent dye imparts a darker color on the fiber-containing product than when the non-permanent dye is absent therefrom. Alternatively, the fiber-containing product with the non-permanent dye may have a lighter color than when the non-permanent dye is absent therefrom. The fiber-containing product may have a lower "h value" than the fiber-containing product without the non-permanent dye. The mulch composition or growing medium may have hsl color coordinates such that the "h value" (hue) is from about 10 to about 40, the "s value" (saturation) is from about 20 to about 100, and the "1 value" (lightness) is less than about 50. The 1 value may be from about 0 to about 25.

The mulch or growing medium may be dyed by bark pigments and/or by one or more natural non-permanent dyes in order to comply with organic standards and secure a certificate from the Organic Materials Review Institute (OMRI).

The dyed fiber produced by the method described above and the resulting mulch or growing medium composition may have a light-fastness, in order of increasing preference, of at least up to 1 day, 5 days, 10 days, 20 days, 1 month, 2 months, or 3 months or more, with minimal fading, measured according to ASTM D4303-99. The term "minimal fading" refers to any visually discernable extent of fading. The light-fastness of the dyed mulch or growing medium may be about 1 to 120 days, about 5 to 90 days, about 10 to 30 days.

As set forth above, the mulch composition or growing medium may include tree bark. The term "bark" refers to a plurality of stem tissues including one or more of cork (phellum), cork cambium (phellogen), phelloderm, cortex, phloem, vascular cambium, and xylem. Examples of useful tree barks include, but are not limited to, bark from pine, oak, walnut, mahogany (*Swietenia macrophylla, Swietenia mahogoni, Swietenia humilis*), hemlock, Douglas fir, alder, elm, birch, Sitka spruce, sycamore, and the like, and combinations thereof. Pine tree bark is found to be particularly useful in the growing medium.

The input bark and/or wood components may be preprocessed in a variety of ways such as cut so that the dimensions of the input wood components and/or bark pieces are about 0.25 inches (0.64 cm) to about 6 inches long and wide, about 1 inch (2.54 cm) to about 4 inches (10.2 cm) long and wide, about 2 inches (5 cm) to about 3 inches (7.6 cm) long and wide. Preferably, the size of the wood components and/or bark pieces is about 2×2 inches (5×5 cm).

The initial density of the wood components and/or bark before the wood components and/or bark are formed into a mulch composition or growing medium by the process described below may be about 15 lbs/ft$^3$ (240.28 kg/m$^3$) to about 35 lbs/ft$^3$ (560.65 kg/m$^3$).

The fibrous mulch composition or growing medium may be combined with additional components. Examples of such additional components include, but are not limited to, fertilizer(s), macronutrient(s), micronutrient(s), mineral(s), binder(s), natural gum(s), interlocking manmade fiber(s), and the like, and combinations thereof. In general, these additional components in total are present in an amount of less than about 10 weight % of the total weight of the mulch composition or growing medium. More preferably, the additional components in total are present in an amount from about 1 to about 15 weight % of the total weight of the mulch composition or growing medium. Additionally, soil may be present in an amount of about 20 weight % or less, about 15 weight % or less, or about 5 weight % or less of the total weight of the mulch composition or growing medium. The soil may be present in an amount of about 0.1 to about 20 weight % of the total weight of the mulch composition or growing medium. Soil may also be absent from the mulch composition or growing medium.

Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers having lesser nutritional value, but providing other advantages such as improving aeration, water absorption, or being environmental-friendly may be used. The source of such fertilizers may be, for example, animal waste or plant waste.

Nutrients are well-known and may include, for example, macronutrient, micronutrients, and minerals. Examples of macronutrients include calcium, chloride, magnesium, phosphorus, potassium, and sodium. Examples of micronutrients are also well-known and include, for example, boron, cobalt, chromium, copper, fluoride, iodine, iron, magnesium, manganese, molybdenum, selenium, zinc, vitamins, organic acids, and phytochemicals. Other macro- and micronutrients are well known in the art.

The binders may be natural or synthetic. For example, the synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinyl alcohol polymers, polyacrylate polymers, polyacrylic acid polymers, polyacrylamide polymers and their anionic- and cationic-modified copolymer analogs, i.e., polyacrylamide-acrylic acid copolymers, and the like. Powdered polyethylene and polypropylene may also be used. When used, synthetic binders are preferably used in aqueous form, for example as solutions, emulsions, or dispersions. While binders are not ordinarily used in growing media, they may be useful in hydraulically applied growing media.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The natural binder may include a variety of starches such as corn starch, modified celluloses such as hydroxyalkyl celluloses and carboxyalkyl cellulose, or naturally occurring gums such as guar gum, gum tragacanth, and the like. Natural and synthetic waxes may also be used.

With reference to FIG. 1, a schematic flowchart illustrating the formation of the mulch composition or growing medium is provided. As can be seen in FIG. 1, in step a), an initial composition 14 is formed by combining tree bark 10 and/or wood components 12 together to form the initial composition 14. The wood components 12 may include wood chips, wood fiber, or both; yet, preferably, the wood components are wood chips. Typically, about 5 to about 95 weight % of tree bark is combined with about 95 to about 5 weight % of wood components, based on the total weight of the mulch composition or growing medium, in step a). Preferably, about 20 to about 70 weight % of tree bark is combined with about 30 to about 80 weight % of wood components, based on the total weight of the mulch composition or growing medium, in step a). Alternatively, about 50 to about 60 weight % of tree bark is combined with about 40 to about 50 weight % of wood components, based on the total weight of the mulch composition or growing medium, in step a). Alternatively still, the initial composition 14 may be substantially bark free and contain about 100% of wood components, based on the total weight of the mulch composition or growing medium.

In step b), the initial composition 14 is heated to an elevated temperature to kill microbes in a pressurized vessel 16. Typically, the heating step may be conducted at a temperature in the range of about 250° F. (121° C.) or lower to about 500° F. (260° C.) or higher, about 300° F. (149° C.) to about 400° F. (204° C.), about 320° F. (160° C.) to 380° F. (about 193° C.). The heating step may be conducted for a time sufficient to kill microbes. The heating step may be conducted for about 1 to about 5 minutes or longer under a steam pressure of about 35 lbs/in$^2$ (102 kg/cm$^2$) to about 120 lbs/in$^2$ (351 kg/cm$^2$) or about 50 lbs/in$^2$ (146 kg/cm$^2$) to about 100 lbs/in$^2$ (293 kg/cm$^2$). For example, the heating step may be conducted at a temperature of about 300° F. (149° C.) for about 3 minutes at about 80 lbs/in$^2$ (234 kg/cm$^2$). For example, the heating step may be conducted at a temperature of about 300° F. (149° C.) for about 3 minutes. The heating step results in a preferably substantially sterile mulch composition or growing medium. The steam flow rate during the heating step may be from about 4000 lbs/hour (1814 kg/hour) to about 15,000 lb/hour (6803 kg/hour).

An example of a pressurized vessel and related process for step b) is disclosed in U.S. Pat. No. 2,757,150, which has been incorporated by reference, in which wood chips are fed to a pressurized steam vessel which softens the chips. Any type of wood chip may be used in this process, but wood chips of the softwood varieties such as yellow poplar, and particularly pine, are preferred.

In step c), the initial composition 14 is processed through a refiner 18 to form the mulch composition or growing medium 20. The refiner 18 may use a plurality of disks to obtain the mulch composition or fibrous growing medium 20. The refiner 18 may use two or more disks, one of which is rotating, to separate wood fibers from each other as set forth in U.S. Pat. No. 2,757,150, the entire disclosure of which is hereby incorporated by reference. The refiner 18 is usually operated at a lower temperature than the temperature used in step b). The refiner 18 may be operated at a temperature in the range of about 70° F. (21° C.) to about 400° F. (204° C.), about 150° F. (150° C.) to about 350° F. (176° C.), about 200° F. (93° C.) to about 300° F. (148° C.). The refiner 18 may be operated under steam. The refiner 18 may be operated at atmospheric pressure or elevated pressures such as pressures of about 50 lb/in$^2$ (146 kg/cm$^2$) or lower to about 100 lb/in$^2$ (293 kg/cm$^2$). Some of the additional components 22 may be added during step c) such as a dye or a surfactant.

In step d), the mulch composition or growing medium 20 is dried at temperatures of about 400° F. (204° C.) to about 600° F. (316° C.) for the time sufficient to reduce the moisture content of the mulch composition or growing medium 20 to a value less than about 45 weight %, less than about 25 weight %, or less than about 15 weight %, based on the total weight of the mulch composition or growing medium 20. The drying step may be about 1 to 10 seconds long, about 2 to 8 seconds long, about 3 to 5 seconds long. The drying step may be longer than 10 seconds. Exemplary equipment for drying of the mulch composition or growing medium 20 in step d) may be a flash tube dryer capable of drying large volumes of mulch composition or growing medium 20 in a relatively short length of time due to the homogeneous suspension of the particles inside the flash tube dryer. While suspended in the heated gas stream, maximum surface exposure is achieved, giving the growing medium uniform moisture. The moisture content of the mulch composition or growing medium 20 may be from about 10 to about 50 weight %, about 20 to about 40 weight %, about 25 to about 35 weight % of the total weight of the mulch composition or growing medium 20.

In an optional step e), the mulch composition or growing medium 20 is further refined, and the additional components 22 set forth above may be added.

As was stated above, the mulch composition or growing medium may be used as a stand-alone mulch composition or growing medium. Alternatively, the mulch composition or growing medium may be added to a conventional mulch composition or growing medium to replace at least partially one or more components. The mulch composition or growing medium may displace peat, composted pine bark, perlite, vermiculite, sand, rock wool, compost, animal manure, rice hulls, hardwood bark, softwood bark, coir, other organic materials such as composted organic matter, the like, or a combination thereof. The mulch composition or growing medium may displace, in order of increasing preference, about 0.5% or more, 1% or more, 5% or more, 10% or more, 15% or more, 20% or more, 25% or more, 30% or more, 40% or more, 45% or more, 50% or more, 60% or more, 70% or more, 80% or more, 90% or more, 95% or more, or 99% or more of at least one of the components named above in a growing mix, based on the total weight of the mulch composition or growing mix. The mulch composition or growing medium may replace about 1 to about 99 weight %, about 20 to about 80 weight %, or about 40 to 60 weight % of one or more components in the conventional mulch composition or growing medium, based on the total weight of the mulch composition or growing medium. An exemplary conventional growing mix may contain, based on the total weight of the growing mix, about 80 weight % of peat and 20 weight % of perlite, which is being added to create air space for the peat. The growing medium of the present invention may replace the perlite entirely and replace at least about 50 weight % of the peat. The resulting growing medium is thus environmentally advantageous as it contains only a relatively low amount of peat and more economical than the conventional growing mix due to replacement of perlite. The resulting growing medium also provides a better balance of air and water retention than the peat-perlite and other conventional growing mixes.

Balanced air (non-capillary) and water (capillary) holding capacity provides ideal growing conditions to plants. The volume of air space is important for root systems and plants in general, as without oxygen, roots cannot grow and absorb water or minerals. The more oxygenated the roots are, the more efficient the plants become in converting sugars into energy for plant growing. Likewise, sufficient water retention of the growing medium is important to ensure that the roots have access to proper amount of water for photosynthesis, root growth, and efficient uptake of water by the growing plant without being oversaturated. Yet, the conventional mulch compositions or growing mixes usually do not achieve balanced air and water retention as typically, when the volume % of water retention rises, it is at the expense of air retention and vice versa.

The mulch composition or growing medium of the present invention advantageously can provide balanced air and water holding capacity at about 25-60 volume % each, preferably between about 43-56 volume % each, more preferably about 48-49 volume % each, based on the total volume of the mulch composition or growing medium, measured in a container having dimensions 30.5×30.5×30.5 cm (12 inches×12 inches×12 inches). The air and water holding capacity may each be without limitation, about 20 volume % or more, 25 volume % or more, 30 volume % or more, 35 volume % or more, 40 volume % or more, 45 volume % or more, 50 volume % or more, 55 volume % or more, 60 volume % or more, or 65 volume % or more, of the total volume of the mulch composition or growing medium, when measured in 30.5×30.5×30.5 cm (12 inches×12 inches×12 inches) container.

Water and air holding capacity, as referred to herein, are measured according to "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein. The water holding capacity is measured by a Container Capacity test which measures the percent volume of a substrate that is filled with water after the growing medium is saturated and allowed to drain. It is the maximum amount of water the growing medium can hold. The drainage is influenced by the height of the substrate, this property is thus dependent on container size. The taller the container, the more drainage it will cause, and the less capacity of the substrate to hold water. The oxygen holding capacity is measured as percent volume of a substrate that is filled with air after the growing medium is saturated and allowed to drain. It is the minimum amount of air the material will have. It is affected by the container height in reverse fashion to container capacity; i.e., the taller the container, the more drainage and therefore more air space.

The sum of water and air holding capacity equal total porosity for a given density and moisture content. Total porosity defines the total volume of pores and refers to percent volume of a substrate that is comprised of pores, or holes. It is the volume fraction which provides the water and aeration in a substrate. The total porosity+the percent solids=100%. Total porosity of the mulch composition or growing medium may be about 88 to about 99 volume %, about 91 to about 98 volume %, about 93 to about 97 volume %, about 94 to about 96 volume %. Total porosity of the mulch composition or growing medium may be about 88 vol. % or more, 91 vol. % or more, 93 vol. % or more, 95 vol. % or more, 97 vol. % or more, 99 vol. % or more.

The water holding capacity (WHC) of the mulch composition or growing medium may be also measured by ASTM D7367-14, a standard test method for determining water holding capacity of fiber mulches for hydraulic planting. According to ASTM D7367-14, the water holding capacity (WHC) of the mulch composition or growing medium may be about 400 to about 1000 weight %, about 500 to 1000 weight %, about 600 to 900 weight %, based on the total weight of the mulch composition or growing medium.

An additional advantage of the mulch composition or growing medium of the present invention is lower dry bulk density as well as wet bulk density when compared to prior art substrates. High density may impose transportation limits on the mulch compositions or growing substrates as such substrates may reach their weight limit before they reach the volume limit feasible for transportation. When compared to higher density media, the lower wet and dry bulk densities of the present mulch composition or growing medium provide greater volume of the mulch composition or growing medium to the end user at the same weight. The low density mulch composition or growing medium of the present invention may be added as a component to prior art mulches or growing media and thus lower their transportation costs by about 5% or more, 10% or more, 15% or more, or 20% or more, as compared to the prior art media alone. Additionally, a consumer may find it easier to purchase and utilize the growing medium of the present invention because of its lower weight. The dry bulk density of the growing medium may be, in order of increasing preference, about 6 lb/ft' or less, 4 lb/ft$^3$ or less, 3 lb/ft$^3$ or less, or 2 lb/ft' or less. The dry bulk density of the mulch composition or growing medium may be about 1.5 lb/ft' to about 6 lb/ft$^3$, about 2 lb/ft$^3$ to about 4 lb/ft$^3$, about 2.2 lb/ft$^3$ to about 2.6 lb/ft$^3$. The wet bulk density of the mulch composition or growing medium may be, in order of increasing preference, about 15 lb/ft' or less, 10 lb/ft$^3$ or less, 8 lb/ft' or less, 6 lb/ft$^3$ or less, 4 lb/ft' or less, 3 lb/ft$^3$ or less, or 2 lb/ft$^3$ or less. The wet bulk density of the mulch composition or growing medium may be about 2 lb/ft$^3$ to about 10 lb/ft$^3$, about 2.2 lb/ft' to about 5 lb/ft$^3$, about 2.4 lb/ft$^3$ to about 3 lb/ft$^3$.

Table 1 below illustrates test results for one embodiment of a mulch composition or growing medium comprising about 80% wood components and about 20% tree bark and another embodiment comprising 100% pine wood fiber, based on the total weight of the mulch composition or growing medium, in comparison to prior art growing media.

TABLE 1

Mulch/growing media properties

| Mulch/growing medium | Volume of air space [vol. %] | Volume of air space - range [vol. %] | Dry bulk density [lb/ft$^3$] | Dry bulk density [kg/m$^3$] | Wet bulk density [lb/ft$^3$] | Wet bulk density [kg/m$^3$] | Moisture content [%] |
|---|---|---|---|---|---|---|---|
| Mulch/growing medium of present invention (80% wood, 20% bark) | 30.25 | 25-75 | 2.37 | 37.96 | 2.83 | 45.33 | 90.99 |
| Mulch/growing medium of present invention (100% pine wood fiber) | 44.53 | 25-75 | 2.20 | 35.24 | 2.49 | 39.89 | 89.80 |
| *Sphagnum* Peat | 10.22 | 5-25 | 4.25 | 68.08 | 12.04 | 192.86 | 85.78 |
| ⅜" Hammermilled Bark | 24.00 | 20-45 | 9.64 | 154.42 | 23.82 | 381.56 | 75.99 |
| Retruder Processed Bark | 14.69 | — | 7.46 | 119.50 | 19.85 | 317.49 | 84.56 |
| Coir Block Fiber | 15.36 | — | 4.42 | 70.80 | 32.55 | 521.40 | 89.33 |

The data in Table 1 was collected by JR Peters Laboratory Allentown, Pa., USA, using "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein.

The percent volume of air space in Table 1 refers to the air holding capacity discussed above which was measured as the percent volume of a substrate that is filled with air after the material is saturated and allowed to drain. It is the minimum amount of air the material will have. The measuring container had the following dimensions: 30.5×30.5×30.5 cm (12 inches×12 inches×12 inches).

The bulk density in Table 1 refers to the ratio of the mass of dry solids to the bulk volume of the substrate. The bulk volume includes the volume of solids and pore space. The mass is determined after drying to constant weight at 221° F. (105° C.), and volume is that of the sample in cylinders.

The moisture content in Table 1 refers to the percent moisture found in a sample on a wet mass basis. This is calculated by: [(Wet weight−Dry weight)/Wet weight]×100. It denotes how much of a particular sample is comprised of water.

Table 2 provides comparison of prior art growing media with two embodiments of the present invention, specifically one embodiment of a mulch composition or growing medium comprising about 80% wood components and about 20% tree bark and another embodiment comprising 100% pine wood fiber, based on the total weight of the mulch composition or growing medium. The loose bulk density data in Table 2 was gained by packing the mulch composition or growing medium into a container measuring 30.5×30.5×30.5 cm (12 inches×12 inches×12 inches) after the mulch composition or growing medium was expanded by an opener and/or by using a process recommended for the specific kind of a mulch composition or growing medium.

TABLE 2

| Mulch/growing medium | Loose bulk density | | | |
|---|---|---|---|---|
| | Expanded bulk density including moisture content of the mulch/ growing medium | | Net dry weight expanded bulk density | |
| | [lb/ft$^3$] | [kg/m$^3$] | [lb/ft$^3$] | [kg/m$^3$] |
| Mulch/growing medium of present invention (80% wood, 20% bark) | 1.2-1.75 | 19.22-28.03 | 0.9-1.35 | 14.42-21.62 |
| Mulch/growing medium of present invention (100% pine wood fiber) | 1.0-1.65 | 16.02-26.43 | 0.75-1.25 | 12.01-20.02 |
| *Sphagnum* Peat | 9.0-12.5 | 144.17-200.23 | 5.0-6.85 | 80.09-109.73 |
| ⅜" Hammermilled Composted Pine Bark | 23-33 | 368.43-528.61 | 11.0-17.5 | 176.20-280.32 |
| ⅜" Hammermilled Aged Pine Bark | 15-20 | 240.28-320.37 | 7.5-10 | 120.14-160.19 |

Table 3 provides a size classification of the fiber of the mulches or growing media; the weight % of material passing through various sieve sizes as well as density, WHC, and total porosity are also provided. Total porosity was measured by the porometer testing "Procedures for Determining Physical Properties of Horticultural Substrates Using the NCSU Porometer by Horticultural Substrates Laboratory," as referenced above.

TABLE 3

| | | Wood fiber size classification | | | | | |
|---|---|---|---|---|---|---|---|
| | | Materials: wt. % wood components/wt. % bark | | | | | |
| | | 90%/10% | 70%/30% | 50%/50% | 30%/70% | 10%/90% | ranges |
| Sieves Mesh/μm | #8/2380 [wt. %] | 15.9 | 26.7 | 21.0 | 8.6 | 4.7 | 4-25 |
| | #16/1180 [wt. %] | 23.8 | 16.3 | 9.6 | 10.1 | 8.9 | 9-30 |
| | #25/710 [wt. %] | 25.0 | 14.9 | 12.5 | 13.7 | 10.1 | 15-35 |
| | #50/300 [wt. %] | 20.7 | 17.6 | 25.6 | 27.0 | 25.4 | 15-30 |
| | #100/150 [wt. %] | 10.0 | 13.5 | 15.4 | 21.1 | 20.4 | 6-15 |
| | pan/<150 [wt. %] | 4.6 | 11.0 | 15.9 | 19.5 | 26.4 | 2-20 |
| Total porosity | Porometer [vol. %] | 96-99 | 94-98 | 93-97 | 91-95 | 88-94 | 88-99 |
| Density | Range [lb/ft$^3$]; [kg/m$^3$] | 1.5-2.0; 24-32 | 1.5-2.5; 32-40 | 2.0-3.25; 40-52 | 3.0-5.0; 48-80 | 3.5-6.5; 56-104 | 1.5-6.5; 24-104 |
| WHC | ASTM D7367-14 [wt. %] | 825-925 | 725-825 | 625-725 | 500-625 | 400-500 | — |

The sieve size of the fiber particles in the end product may range from US sieve size #8 to #100, but other sieve sizes are contemplated. The size of the fiber in the mulch composition or growing medium may range from about 0.149 mm to about 2.38. Some of the wood components and/or bark may be processed in such a way that they become a powder with a particle size of about 30 μm or smaller to about 600 μm or larger. Generally, the smaller the fiber size, the higher the WHC.

In the Table 3 above, 79.5% of the wood/bark fiber components of the composition having 90 wt. % wood components and 10 wt. % bark, has a particle size smaller than 2036 μm and larger than 150 μm. 62.3% of the wood/bark fiber components of the composition having 70 wt. % wood components and 30 wt. % bark has a particle size smaller than 2036 μm and larger than 150 μm. 63.1% of the wood/bark fiber components of the composition having 50 wt. % wood components and 50 wt. % bark has a particle size smaller than 2036 μm and larger than 150 μm. 71.9% of the wood/bark fiber components of the composition having 30 wt. % wood components and 70 wt. % bark has a particle size smaller than 2036 μm and larger than 150 μm. 64.8% of the wood/bark fiber components of the composition having 10 wt. % wood components and 90 wt. % bark has a particle size smaller than 2036 μm and larger than 150 μm.

The mulch composition or growing medium may be also used in hydraulic applications. The hydraulically-applied mulch composition or growing medium presents an effective solution for restoration of vegetation and erosion control. The hydraulically-applied mulch composition or growing medium may bond directly to soil while protecting seed, thus sheltering seedlings and/or plants from wind, heavy rain, and other environmental conditions while allowing seed germination and plant growth. The hydraulically-applied mulch composition or growing medium may be used to secure statically-compromised slopes, stabilize highly erodible soil, reintroduce native species of plants, the like, or a combination thereof. The hydraulically-applied mulch composition or growing medium may be used alone or in combination with other erosion-control methods. The hydraulically-applied mulch composition or growing medium may be used during highway projects, recreational projects such as golf courses, in mine reclamation areas, in industrial or other applications.

The hydraulically-applied mulch composition or growing medium may be applied to a site at once or in a plurality of stages. The mulch composition or growing medium may be mixed together with water, and optionally seed, chemical binders, natural gums, and/or interlocking manmade fibers, and/or other components in a tank of a hydro-spraying machine or another suitable equipment. The seed may contain one species or comprise a mix of species such as native or non-native grasses, wildflowers, forbs, or other desirable species. The mixing may continue until all fiber of the mulch composition or growing medium is substantially broken apart and hydrated. When proper viscosity and activation of bonding additives is achieved, additional components named above or other components such as fertilizers, macronutrients, and/or micronutrients, may be added. The hydrated mulch composition or growing medium may be then applied onto the site from a suitable equipment such as a hydro-spraying machine with a fan-type nozzle. Immediately after application, the mulch composition or growing medium bonds directly to the soil and provides protection for dormant seed, minimizes soil loss, and assists in fast establishment of vegetation at the application site.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A growing medium comprising:
   about 20 to about 70 weight % fibrous tree bark, based on the total weight of the growing medium; and
   about 30 to about 80 weight % fibrous wood components, based on the total weight of the growing medium,
   wherein the growing medium has a dry bulk density of about 48 kg/m$^3$ or lower and wet bulk density of about 120 kg/m$^3$ or lower.

2. The growing medium of claim 1, wherein the growing medium has a total porosity of 88 volume % or more.

3. The growing medium of claim 1, wherein the growing medium has a total porosity of 95 volume % or more.

4. The growing medium of claim 2, wherein water holding capacity of the growing medium according to ASTM D7367-14 is about 400 to 1000 weight %, based on the total weight of the growing medium.

5. The growing medium of claim 1, wherein 62.3-79.5% of the fibrous tree bark and the fibrous wood components have a particle size less than 2380 μm and greater than 150 μm.

6. The growing medium of claim 4, wherein the growing medium comprises about 10.1-25.0 weight % fibrous tree bark and fibrous wood components, based on the total weight of the growing medium, having a particle size greater than 710 μm and less than 1180 μm.

7. The growing medium of claim 4, further comprising at least one of fertilizer(s), macronutrient(s), micronutrient(s), mineral(s), chemical binder(s), natural gum(s), interlocking manmade fiber(s), soil, or seed.

8. The growing medium of claim 4, wherein the fibrous wood components comprise refined wood chips, wood fiber, or both.

9. The growing medium of claim 4, wherein the fibrous tree bark comprises pine tree bark.

10. The growing medium of claim 4, wherein the growing medium comprises about 50 to about 60 weight % fibrous tree bark and about 40 to about 50 weight % fibrous wood components, based on the total weight of the growing medium.

11. The growing medium of claim 4, wherein the growing medium comprises about 10 to about 60 weight % fibrous tree bark and about 40 to about 90 weight % fibrous wood components, based on the total weight of the growing medium.

12. The growing medium of claim 11, wherein the growing medium is sterile.

13. A growing mix composition comprising:
    about 40 to 85 weight % growing medium including fibrous tree bark and fibrous wood components; and
    about 15 to 60 weight % peat,
    wherein the growing medium has total porosity of 91 volume % or more.

14. The growing mix composition of claim 13, wherein the growing mix is substantially free of perlite.

15. The growing mix composition of claim 14, wherein the growing medium further comprises at least one of fertilizer(s), macronutrient(s), micronutrient(s), mineral(s), chemical binder(s), natural gum(s), interlocking manmade fiber(s), soil, or seed.

16. The growing mix composition of claim 13, further comprising composted pine bark, vermiculite, sand, rock wool, compost, animal manure, rice hulls, hardwood bark, softwood bark, coir, or a combination thereof.

17. The growing mix composition of claim 13, wherein the growing medium comprises about 5 to about 95 weight % fibrous tree bark and about 5 to about 95 weight % fibrous wood components, based on the total weight of the growing medium.

18. The growing mix composition of claim 17, wherein the fibrous tree bark comprises pine tree bark.

19. The growing mix composition of claim 18, wherein the growing medium has a dry bulk density between 24 and 104 kg/m$^3$.

20. A growing medium comprising:
   about 100 weight % fibrous pine wood components,
   wherein the growing medium has a dry bulk density of 12.01 to 20.02 kg/m$^3$ and wet bulk density of about 120 kg/m$^3$ or lower,
   wherein the growing medium has a total porosity of 91 volume % or more, and
   wherein water holding capacity of the growing medium according to ASTM D7367-14 is about 400 to 1000 weight %, based on the total weight of the growing medium.

21. The growing medium of claim 20, wherein the growing medium is sterile.

* * * * *